United States Patent
Bossens et al.

(10) Patent No.: US 12,155,934 B2
(45) Date of Patent: Nov. 26, 2024

(54) CONTAINER SCANNING SYSTEM WITH WASHING STATION

(71) Applicant: CAMCO TECHNOLOGIES NV, Heverlee (BE)

(72) Inventors: Jan Amandus Michel Maria Bossens, Linden (BE); Jef Simon Gaston De Geeter, Leuven (BE)

(73) Assignee: CAMCO TECHNOLOGIES NV, Heverlee (BE)

( * ) Notice: Subject to any disclaimer, the term of this patent is extended or adjusted under 35 U.S.C. 154(b) by 373 days.

(21) Appl. No.: 17/619,027

(22) PCT Filed: Apr. 27, 2020

(86) PCT No.: PCT/EP2020/061575
§ 371 (c)(1),
(2) Date: Dec. 14, 2021

(87) PCT Pub. No.: WO2021/004668
PCT Pub. Date: Jan. 14, 2021

(65) Prior Publication Data
US 2022/0297982 A1 Sep. 22, 2022

(30) Foreign Application Priority Data
Jul. 5, 2019 (EP) .................................... 19184802

(51) Int. Cl.
*B66C 13/18* (2006.01)
*B08B 3/02* (2006.01)
(Continued)

(52) U.S. Cl.
CPC ........... *H04N 23/695* (2023.01); *B08B 3/022* (2013.01); *B08B 13/00* (2013.01);
(Continued)

(58) Field of Classification Search
CPC ..... B66C 19/002; B66C 19/007; B66C 13/46; H04N 7/188; H04N 23/695; B08B 13/00; B08B 3/022; B08B 2203/027
See application file for complete search history.

(56) References Cited

U.S. PATENT DOCUMENTS 5,733,582 A * 3/1998 Johnson .................. B29C 44/60
425/169
5,838,759 A 11/1998 Armistead
(Continued)

FOREIGN PATENT DOCUMENTS

EP 3296247 A1 3/2018
WO WO-9800681 A1 * 1/1998 ........... B66C 19/007
(Continued)

OTHER PUBLICATIONS

Extended European Search Report from corresponding Application No. EP19184802.7, Jan. 2, 2020.
(Continued)

*Primary Examiner* — Benjamin L Osterhout
(74) *Attorney, Agent, or Firm* — Workman Nydegger (57) ABSTRACT

A container scanning system includes: a camera/sensor unit movably mounted on a container handling crane, having a camera and/or sensor for scanning the exterior surface of a container; a control unit configured to control movement of the camera/sensor unit; and a rail mounted on a support beam of the container handling crane, the camera/sensor unit being movably mounted on the rail. The container scanning system includes a washing station mounted on the support beam or the rail at a predetermined location. In a washing mode, the control unit moves the camera/sensor unit to the predetermined location and controls the washing station to wash at least a surface of the camera and/or sensor.

13 Claims, 6 Drawing Sheets

(51) Int. Cl.
    *B08B 13/00*     (2006.01)
    *B66C 23/62*     (2006.01)
    *H04N 5/232*     (2006.01)
    *H04N 23/695*     (2023.01)
    *B66C 13/46*     (2006.01)
    *B66C 19/00*     (2006.01)
    *H04N 7/18*     (2006.01)

(52) U.S. Cl.
    CPC ......... *B08B 2203/027* (2013.01); *B66C 13/46* (2013.01); *B66C 19/002* (2013.01); *B66C 19/007* (2013.01); *H04N 7/188* (2013.01)

(56) References Cited

U.S. PATENT DOCUMENTS

| | | |
|---|---|---|
| 7,783,003 B2 | 8/2010 | Clayton et al. |
| 2004/0126015 A1 | 7/2004 | Hadell |
| 2008/0100706 A1* | 5/2008 | Breed ............... B60R 21/01536 <br> 348/143 |
| 2014/0009612 A1* | 1/2014 | King .................... G06Q 10/087 <br> 348/143 |
| 2014/0067313 A1* | 3/2014 | Breed .................... G01P 15/02 <br> 702/141 |
| 2019/0367335 A1 | 12/2019 | Gerdhenrichs et al. |

FOREIGN PATENT DOCUMENTS

| | | | |
|---|---|---|---|
| WO | 2014072509 A1 | 5/2014 | |
| WO | WO-2017135851 A1 * | 8/2017 | ............ B66C 1/101 |

OTHER PUBLICATIONS

International Search Report and Written Opinion from PCT Application No. PCT/EP2020/061575, Jul. 24, 2020.

* cited by examiner

CONTAINER SCANNING SYSTEM WITH WASHING STATION

FIELD OF THE INVENTION

The present invention generally relates to a container scanning system, i.e. a camera-based and/or sensor-based system for recognizing and reading an item or simply detecting the presence of an item by scanning the exterior surface of cargo containers that are transferred by a container handling crane. The item can be a container identification, a class identification, an IMDG code or International Maritime Dangerous Goods code, a seal, etc. The invention is applicable to different types of cranes that handle cargo containers in port or railway areas like for instance ship-to-shore or STS cranes, i.e. manual or (semi-)automatic cranes that load containers onto a ship or unload containers from a ship under supervisory control of an operator, rail mounted gantry or RMG cranes used for stacking containers in a storage area of the container terminal, rubber tired gantry or RTG cranes used for stacking containers in a storage area of a container terminal, automatic rail mounted gantry or ARMG cranes that are fully automated and enable a single operator to supervise many cranes, automatic stacking cranes or ASCs, etc. The invention is further applicable in situations where the crane's spreader transfers a single container or multiple containers.

BACKGROUND OF THE INVENTION

In order to be able to register and track individual containers that are loaded/unloaded to/from a ship, a train, a truck chassis or trailer, containers are given a unique identification (ID) that is marked on an exterior surface of the container. The container identification typically is an alphanumeric code that is marked onto the top-side, front-side, rear-side or a side of the container. In addition to the container identification, other information marked onto the container or attached to the container may be read or recognized each time a container is transferred by a container handling crane. An example of such additional information is the seal attached to container doors, typically at the rear-side of the container. The seal may for instance contain an RFID (Radio-Frequency Identification) tag. Other examples are a class identification or the IMDG (International Maritime Dangerous Goods) code when dangerous or hazardous materials are contained.

United States Patent Application US 2004/0126015 entitled "Container Identification and Tracking System" describes a system for automatically identifying containers that are loaded/unloaded by a crane. The system consists of several cameras fixedly mounted on the sill beams of the crane. These cameras are referenced 13a, 13b and 13c in FIG. 6 of US 2004/0126015 whereas the sill beams of the crane are referenced 12a and 12b. These sill beams are horizontal beams of the container handling crane, typically mounted at a height of 6 meter from the quay in a direction perpendicular to the boom of the crane, i.e. parallel to the quay border. The sill beam mounted cameras create a scan window at a height of 6 meters where the exterior surface of the side of the container can be scanned, typically while the container is vertically moved by the spreader. In order to decide which camera(s) to activate, the system described in US 2004/0126015 contains a camera control system that receives information indicative for the horizontal position where the container will pass, the so-called spreader width information in paragraph [3] of US 2004/0126015.

The sill beam solution is disadvantageous for various reasons as will be explained in the following paragraphs.

Firstly, the container identification becomes available late in the container handling process. The sill beam solution enables to scan and read a container identification only at the point in time where the spreader holding the container passes the window at 6 meter height above the quay where the cameras are located. In case of unloading a container from a ship, the information identifying the container is available very late in the process of transferring the container, i.e. only a few seconds before the container is unlocked from the spreader.

Secondly, the sill beam solution is expensive in maintenance since it requires plural cameras. In the implementation illustrated by FIGS. 5 and 6, and described in paragraph [3] of US 2004/0126015 for instance, three cameras are mounted on each of the sill beams. Since these cameras are operating in difficult conditions resulting from the presence of wind and water in port or railway areas, their lifetime is limited and maintenance requirements are high. Plural cameras mounted on the sill beams consequently increase the installation and operational costs for the container terminal operator.

Further disadvantageously, front-sides and rear-sides of the containers cannot be scanned in the sill beam solution. Since the cameras are mounted on the sill beams, only container identifications marked on the side of the container can be scanned. In case the container identification or other useful information such as the IMDG code or seal is marked on or attached to a front-side or rear-side of the container, the sill beam mounted cameras cannot be used. A straightforward solution enabling to scan front-sides and rear-sides of containers could consists in mounting also cameras on the portal beams of the crane, i.e. the horizontal beams parallel to the boom of the crane at a typical height of 13 to 16 meter from the quay. Such additional cameras however would further increase the installation and maintenance costs for the terminal operator and would further slow down the container handling process since the spreader would have to move the container(s) through a scan window at a typical height of 13 to 16 meter.

An alternative solution enabling to scan front-sides and rear-sides of containers consists in a crane system with rotating flywheel to rotate the container as for instance suggested in U.S. Pat. No. 7,783,003 entitled "Rotating Carriage Assembly for Use in Scanning Cargo Conveyances Transported by a Crane". Such solution however requires a dedicated type of crane with rotating flywheel and therefore is not applicable to installed cranes that lack such flywheel.

The best existing solution is described in International Patent Application WO 2014/072509 A1, entitled "A Container Scanning System". The container scanning system described in this patent application from Camco Technologies NV and commercialised as the BoxCatcher camera system comprises a rail, a camera/sensor unit and a control unit. The rail is mounted on a support or beam of a container handling crane. The camera/sensor unit is movably mounted along the rail. The camera/sensor unit comprises one or plural cameras and/or one or plural sensors for scanning the exterior surface of a container. The control unit is operationally coupled to the camera/sensor unit. The control unit is able to obtain position information indicative for the operational position of the container handling crane, and the control unit is configured to control movement of the camera/sensor unit along the rail in function of the position information. The rail contains space for wiring for power feeding the camera/sensor unit.

In the container scanning system known from WO 2014/072509 A1, it is no longer needed for the spreader to move the container(s) through a particular window where a fixed camera is located, since the camera/sensor unit is now moved to the height (or alternatively the depth or width) where the container is handled by the crane. An immediate advantage thereof is that the invention improves the overall performance of the terminal since a higher amount of moves per hour can be executed.

The use of a rail is advantageous over straightforward implementations using cables or movable arms that poorly perform in hard environmental conditions resulting from the presence of wind, water and salt in port or railway areas. The rail requires less inspection and maintenance as a result of which the downtime and operational costs are reduced.

Further, the camera/sensor unit can be moved along the rail into a service position for maintenance reasons. In case the rail is vertically mounted, the service position may for instance be the lowest position along the rail. Maintenance of the camera and eventual other electronics in the camera/sensor unit can then be carried out without involvement of exceptionally high boom trucks.

The salt, sand and humidity inevitably present in seaside ports impose daily maintenance and cleaning of at least the camera/sensor unit. Even if the camera/sensor unit can be moved along a vertical rail into a service position, cleaning the camera/sensor unit in order to guarantee proper functioning thereof requires daily manual interventions by an operator, which is costly and time-consuming. For a camera/sensor unit that moves along a horizontal rail at a certain height, a boom truck, a lift or aerial platform is still needed to clean the camera/sensor unit, even if the camera/sensor unit can be moved along the rail into a predetermined service position.

It is also important to note that there is an evolution towards development and installation of higher cranes. Whereas today's cranes have typical hoisting heights of 30 meters above rail or quay level, next generation cranes will have heights that extend beyond 50 meters. These cranes will be able to operate at different heights. The maintenance or reparation of electronics or components that operate at such heights will become even more difficult, in particular in harbours where the environmental conditions of wind and water are hard. Moreover, the availability of boom trucks that can be used for maintenance purposes and can reach heights above 30 meters is scarce.

It is therefore an object of the present invention to provide a container scanning system that resolves the above identified shortcomings of the prior art. More particularly, it is an objective of the present invention to disclose a container scanning system with increased reliability and reduced maintenance cost and complexity.

SUMMARY OF THE INVENTION

According to the present invention, the above-identified object is achieved by the container scanning system defined by claim 1, comprising:
- a camera/sensor unit movably mounted on a container handling crane, the camera/sensor unit comprising a camera and/or sensor for scanning the exterior surface of a container;
- a control unit operationally coupled to the camera/sensor unit, and configured to control movement of the camera/sensor unit;
- a rail mounted on a support beam of the container handling crane, the camera/sensor unit being movably mounted on the rail,
- wherein the container scanning system further comprises a washing station mounted on the support beam or the rail at a predetermined location; and
- wherein the control unit is configured to control, in a washing mode, movement of the camera/sensor unit to the predetermined location and to control the washing station to wash at least a surface of the camera and/or sensor.

Thus, the system according to the invention foresees in a washing station for the camera and/or sensor unit, at a predetermined location along the rail or beam where the rail is mounted on, and the ability to control movement of the camera and/or sensor unit to the washing station that is automatically activated upon arrival of the camera and/or sensor unit. The predetermined location could for instance correspond to the service or maintenance position where the sensor unit is also moved to in case repair or maintenance of the electronics is required, but may alternatively correspond to a different predetermined location along the rail or beam. Preferably, the predetermined location of the washing station is reachable by man without a lift, boom truck or aerial platform, such that filling or replacing a reservoir with cleaning fluid must not be done at heights requiring such tools. The presence of a washing station at a predetermined location along the rail or beam allows for example to daily wash the camera and/or sensor unit or at least the surface of the camera(s) and/or sensor(s) that must be clean in order to ensure proper registration, for instance the camera lenses. The automatic washing can be executed at regular, pre-programmed times, or at downtime of the crane and requires no human involvement, i.e. no dispatching of cleaning or maintenance personnel to manually clean the camera and/or sensor unit. Alternatively, the washing may be done upon instruction of an operator in which case the human involvement remains restricted to entering the washing instruction, or an artificial intelligence unit may take control over the washing times for the camera and/or sensor unit. Washing the camera and/or sensor unit is made less costly and complex through the present invention, can be done with reduced impact on the efficiency of the crane, and can be executed more frequently to enhance the reliability as well as the lifetime of the container scanning system.

In embodiments of the container scanning system according to the invention defined by claim 2, the washing station comprises:
- a main washing unit fixedly attached to the support beam or the rail at the predetermined location; and
- a washing arm extending from the main washing unit in a direction facing the surface of the camera and/or sensor unit.

Thus, in preferable embodiments of the invention, the washing station is composed of a main unit fixedly attached to the beam or rail, and an arm extending away from the main unit in the direction of the area where the camera and/or sensor unit passes when moving along the rail. The main unit shall typically host the reservoir(s) for washing liquids and/or drying air, as well as the pump(s) and/or compressor(s) that bring the liquid(s) and air at the appropriate pressure. The arm shall typically contain the conduits and sprinklers and shall be dimensioned and shaped such that the sprinklers face the surface(s) of the camera and/or sensor unit that will be washed during a washing cycle.

In embodiments of the container scanning system according to the invention defined by claim 3, the washing station comprises:
- a liquid tank to hold a washing liquid, the liquid tank being refillable or replaceable;
- a liquid pump coupled to the liquid tank; and
- a liquid conduit coupled to the liquid pump and extending into the washing arm.

Indeed, the main unit attached fixedly attached to the beam or rail in embodiments of the invention shall comprise a refillable tank or reservoir for the liquid that is used to wash the camera and/or sensor unit. This liquid may for instance be water, an aqueous solution of detergent or soap, alcohol, etc. The washing liquid may be kept under pressure in the tank or reservoir. A pump or compressor coupled to the tank enables to transfer liquid from the tank towards one or plural conduits that extend into the washing arm where sprinklers allow to spray the pumped liquid onto the surface(s) of the camera and/or sensor unit to be cleaned. The tank or reservoir preferably is dimensioned to hold washing liquid for many washing cycles. Operation of the camera and/or sensor unit need not be interrupted as the person only has to refill the washing liquid and therefore only needs access to the main washing unit.

In embodiments of the container scanning system according to the invention defined by claim 4, the washing station comprises:
- an air intake;
- an air pump coupled to the air intake to compress air; and
- an air conduit coupled to the air pump and extending into the washing arm.

This way, in embodiments that dry the washed camera and/or sensor unit using air, the main unit attached fixedly attached to the beam is equipped with an air intake and pump or compressor configured to compress air before feeding the compressed air to one or plural conduits that extend into the washing arm. The conduits used for air may be the conduits that have been used to transport the washing liquid. In preferred embodiments however, separate conduits are used for the air and washing liquid. A single washing arm may comprise both the conduits for washing liquid and the conduits for drying air. Alternatively, a separate drying arm may be foreseen to hold the air conduits.

In embodiments of the container scanning system according to the invention defined by claim 5, the washing station comprises:
- wipers mounted on the washing arm to dry the surface of the camera/sensor unit.

Indeed, as an alternative to drying the washed camera and/or sensor unit with compressed air, embodiments of the system may comprise drying wipers, made for instance of chamois leather, soft rubber, firm rubber, etc., that dry the washed surface(s) of the camera and/or sensor unit through back-and-forth movement of the wipers along the surface(s) to be dried.

In embodiments of the container scanning system according to the invention defined by claim 6, the washing arm comprises:
- a liquid conduit; and
- liquid sprinklers directed towards the surface of the camera/sensor unit.

Indeed, the washing arm preferably comprises a plurality of sprinklers for the washing liquid, evenly distributed along the length of the arm in order to evenly distribute the washing liquid along the surface(s) of the camera and/or sensor unit. The camera and/sensor unit may be controlled to move up end down (or back and forth) along the rail while the washing liquid is sprinkled in order to further assist in evenly distributing the washing liquid along the surface(s) of the camera and/or sensor unit to be washed. As an alternative to sprinklers, the washing arm may be equipped with small holes or nozzles releasing the washing liquid in the direction of the camera and/or sensor unit, or sprayers that atomize and spray washing liquid in the direction of the camera and/or sensor unit.

In embodiments of the container scanning system according to the invention defined by claim 7, the washing arm comprises:
- an air conduit; and
- air vents directed towards the surface of the camera/sensor unit.

Indeed, the washing arm or alternatively a separate drying arm may be equipped with small holes or vents, evenly distributed along the length of the arm, in order to release the compressed drying air over the surface(s) of the camera and/or sensor unit to be dried.

In embodiments of the container scanning system according to the invention defined by claim 8, the washing arm is movably mounted on the main washing unit to cover the entire surface of the camera/sensor unit during the washing mode.

Indeed, the washing arm shall typically be smaller than the surface of the camera and/or sensor unit to be washed. In order to wash the entire surface during a washing cycle, the washing arm may be moved up and down (or back and forth) during a washing cycle. The main washing unit may thereto be equipped with an electric motor that moves the washing arm up and down (or back and forth).

In alternate embodiments of the container scanning system according to the invention defined by claim 9, the control unit is configured to move the camera/sensor unit vertically upward and downward during the washing mode to cover the entire surface of the camera/sensor unit by the washing arm.

Indeed, as an alternative to moving the washing arm up and down (or back and forth), the camera and/or sensor unit may be moved up and down (or back and forth) during the washing cycle. This allows to produce a less complex main washing station with fixed washing arm, not requiring an electrical motor and/or moving parts that would require maintenance and would reduce the lifetime of the washing station.

In embodiments of the container scanning system according to the invention, defined by claim 10, the predetermined location corresponds to a manually reachable height along the portal beam.

In embodiments of the container scanning system according to the invention, defined by claim 11, the washing mode is entered at regular, pre-programmed times.

As already mentioned above, the washing cycles for a camera and/or sensor unit may be pre-programmed at regular time intervals, for instance daily at 10:00 PM.

In embodiments of the container scanning system according to the invention, defined by claim 12, the washing mode is entered upon instruction of a human operator.

As an alternative to pre-programmed washing times, the washing cycles for a camera and/or sensor unit may take place on instruction of a human operator. The human operator can consider activity of the crane and container scanning system and plan the washing cycles at downtimes of the crane to avoid or minimize interruption of the container scanning system for washing purposes. Executing the washing cycles on human instruction however has the disadvantage that the washing of a camera and/or sensor unit may not be executed as regularly as required, with negative impact on the reliability and lifetime of the camera and/or sensor unit.

In embodiments of the container scanning system according to the invention, defined by claim 13, the washing mode is entered upon instruction of an artificial intelligence algorithm.

Indeed, in yet another embodiment, the washing cycles for a camera and/or sensor unit may be scheduled by an artificial intelligence unit that considers parameters like for instance scheduled operation times of the crane, weather conditions that result in faster/slower washing needs, weather forecasts for the hours or days ahead, operator preferences, etc. The artificial intelligence unit may adapt over time and learn for instance in view of malfunctioning of the camera and/or sensor unit what would be appropriate times for washing the camera and/or sensor unit thereby minimizing interruption of the crane, minimizing the use of washing liquid, and minimizing intervention by technicians.

DETAILED DESCRIPTION OF EMBODIMENT(S)

FIG. 1A-1D show a system 100 comprising a camera/sensor unit 101 attached to a rail 102 along which the camera/sensor unit 101 is able to move under control of a control unit not shown in the drawings. The rail 102 is mounted on a vertical portal beam 103 of a container handling crane. Preferably, the rail 102 has internal spacing for power wiring where the camera/sensor unit 101 is connected to. Data connectivity between the camera/sensor unit 101 and the above-mentioned control unit may be wireless or wired. Wired data connectivity may for instance be established over the powering cables housed in the rail 102. The camera/sensor unit 101 has a front cover 111 with an opening 112 for one or plural cameras or sensors that scan the surface of a container handled by the crane, and openings 113 for LED light projectors that enable the camera/sensor unit 101 to also operate at night or in various weather conditions with limited visibility.

FIG. 1A-1D further show the main unit 104 and arm 105 of a washing station that forms part of container scanning system 100. This washing station will be described in more detail below with reference to FIG. 2A-2E, wherein the washing station is labelled 200.

The washing station 200 shown in FIG. 2A-2E comprises a main washing unit 104 and a washing arm 105. The main washing unit 104 is designed to be fixedly mounted on the vertical portal beam 103, at a predetermined location, preferably a height where it is manually reachable by personnel. The washing arm 105 is extending away from the main washing unit 104, in a direction towards the area where the camera and/or sensor unit 101 is moving. The washing arm 105 is curved to follow the shape of the front panel 111 of the camera and/or sensor unit 101, and its back surface is provided with liquid sprinklers 151, distributed regularly along the length of the washing arm 105, and air vents 152, also evenly distributed along the length of the washing arm 105.

The main washing unit 104 comprises a liquid reservoir 141 designed and dimensioned to hold a volume of washing liquid for 5 a 10 washing cycles. The liquid reservoir 141 is refillable or replaceable, for instance via a hinging front door of the main washing unit 104 that is manually reachable by personnel that is instructed to weekly refill or replace the liquid reservoir 141. Liquid pumps 142 are coupled to an outlet of liquid reservoir 141. The liquid pumps 142 are activated by a control unit that first instructs the camera and/or sensor unit 101 to move to the washing position. When activated, the liquid pumps 142 pump washing liquid from the liquid reservoir 141 into liquid conduits 143, 153 that extend into the washing arm 105 and connect with the liquid sprinklers 151. This way, washing liquid is sprinkled or sprayed under pressure onto the front surface 111 of the camera and/or sensor unit 101. During such wash cycle, the control unit instructs the camera and/or sensor unit 101 to move up and down along the rail 102 such that the entire front surface 111 or at least the portion thereof containing the opening or transparent protection 112 for the camera lenses and/or sensors gets cleaned.

The main washing unit 104 further also comprises an air intake 144 with filter the outlet of which is coupled to air pumps 146. The air pumps 146 are also activated by the control unit, after a wash cycle. When activated, the air pumps compress air into air conduits 145, 155 that extend into the washing arm 105 and connect with the air vents 152. This way, compressed air is directed towards the front surface 111 of the camera and/or sensor unit 101 in order to dry this surface during a drying cycle following the wash cycle. During such drying cycle, the control unit again instructs the camera and/or sensor unit 101 to move up and down along the rail 102 such that the entire front surface 111 or at least the portion thereof containing the opening or transparent protection 112 for the camera lenses and/or sensors gets dried.

Figure 1A:
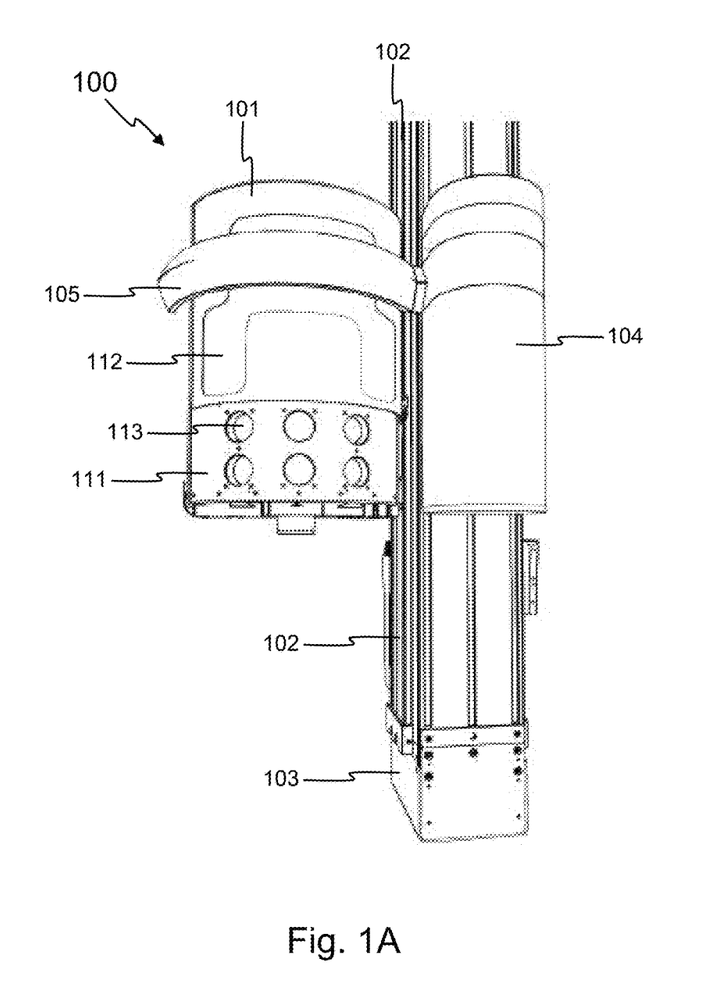
FIG. 1A-1D respectively show a front view, a top-left side view, a top-right side view and a top view of an embodiment of the container scanning system 100 according to the invention.
Figure 1B:
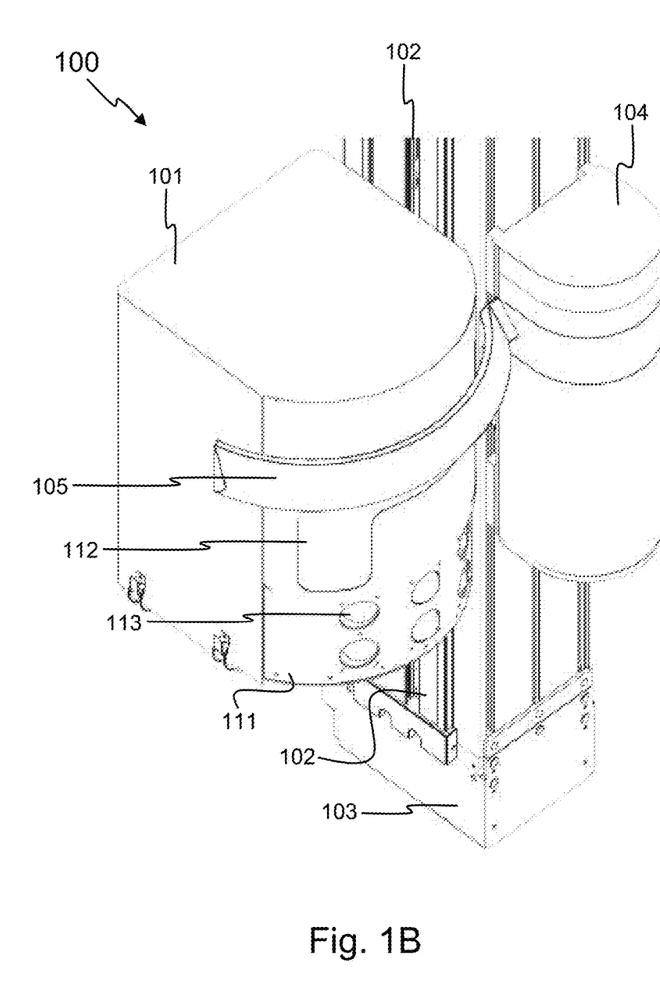
Figure 1C:
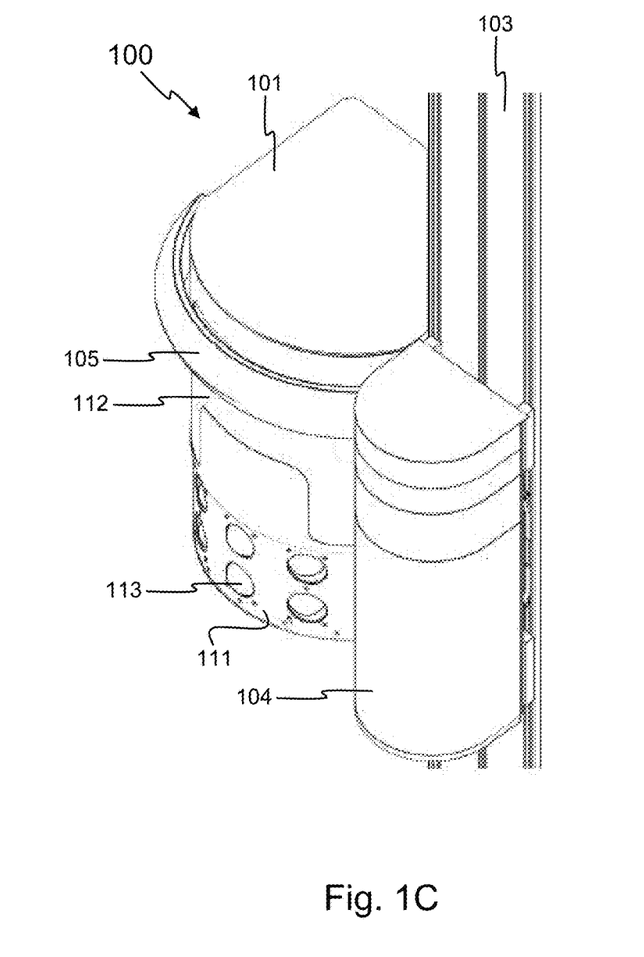
Figure 1D:
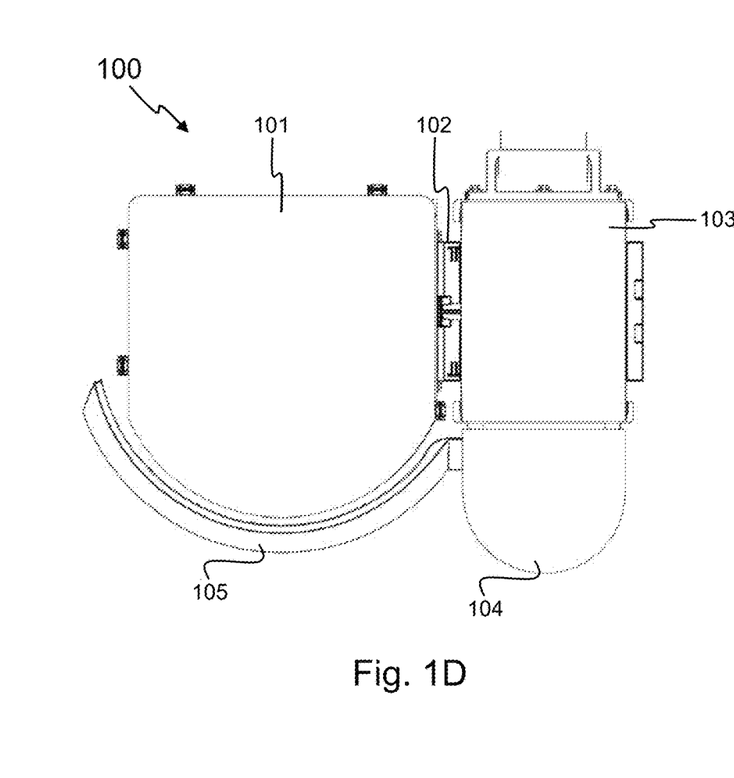
Figure 2A:
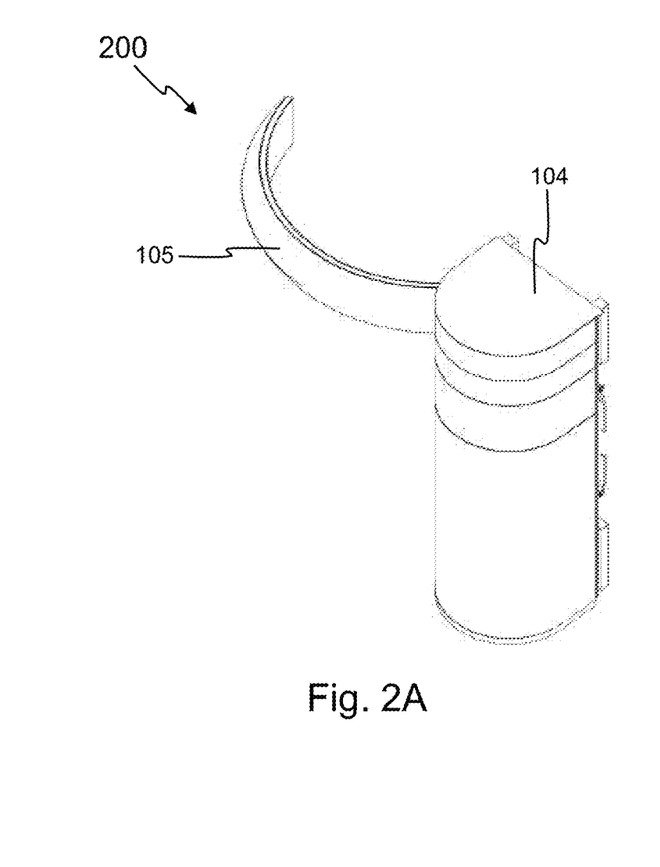
FIG. 2A-2E respectively show a top-right side view, a top view, a front view, a back view and an interior view of the washing station 200 that forms part of the embodiment of the container scanning system 100 according to the invention illustrated by FIG. 1A-1D.
Figure 2B:
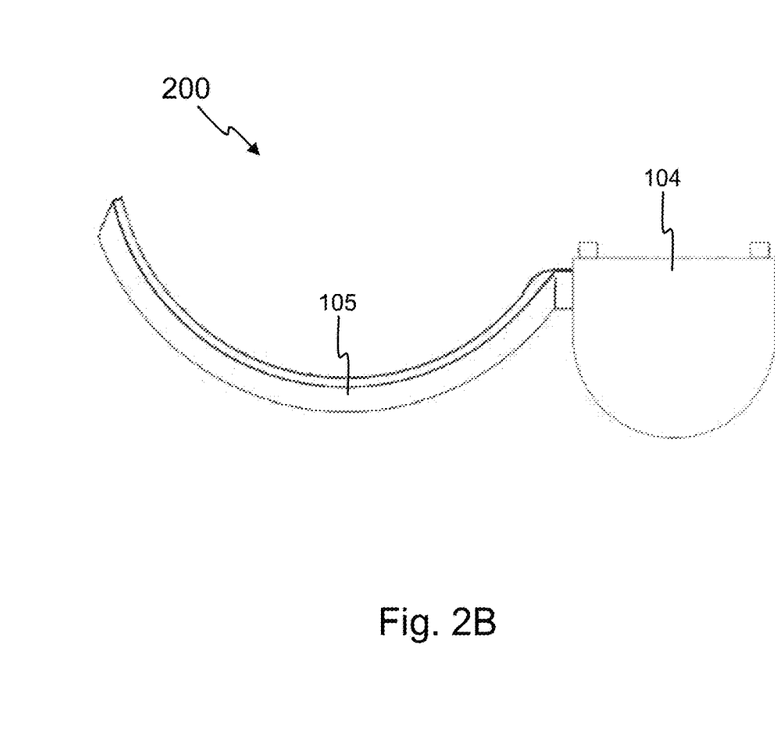
Figure 2C:
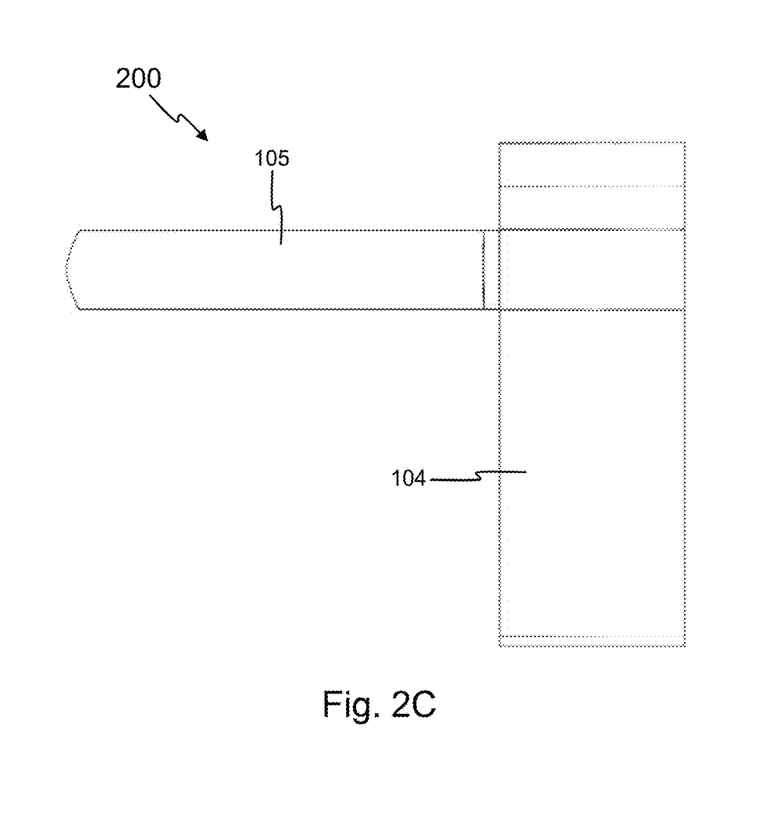
Figure 2D:
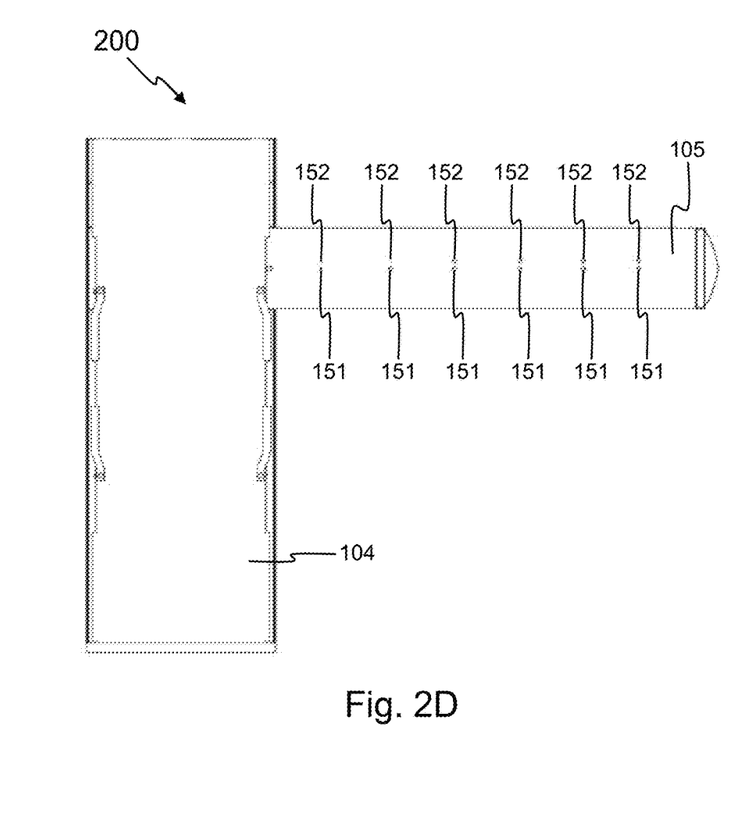
Figure 2E:
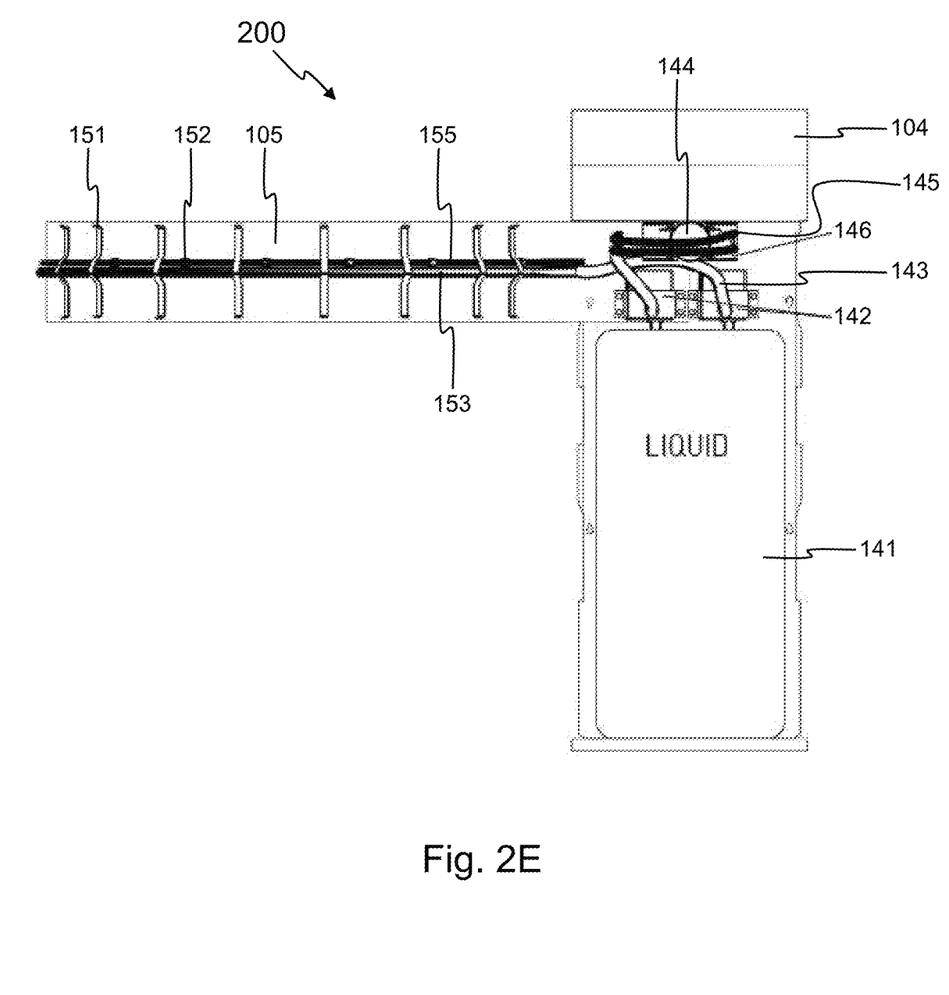
Figure 3:
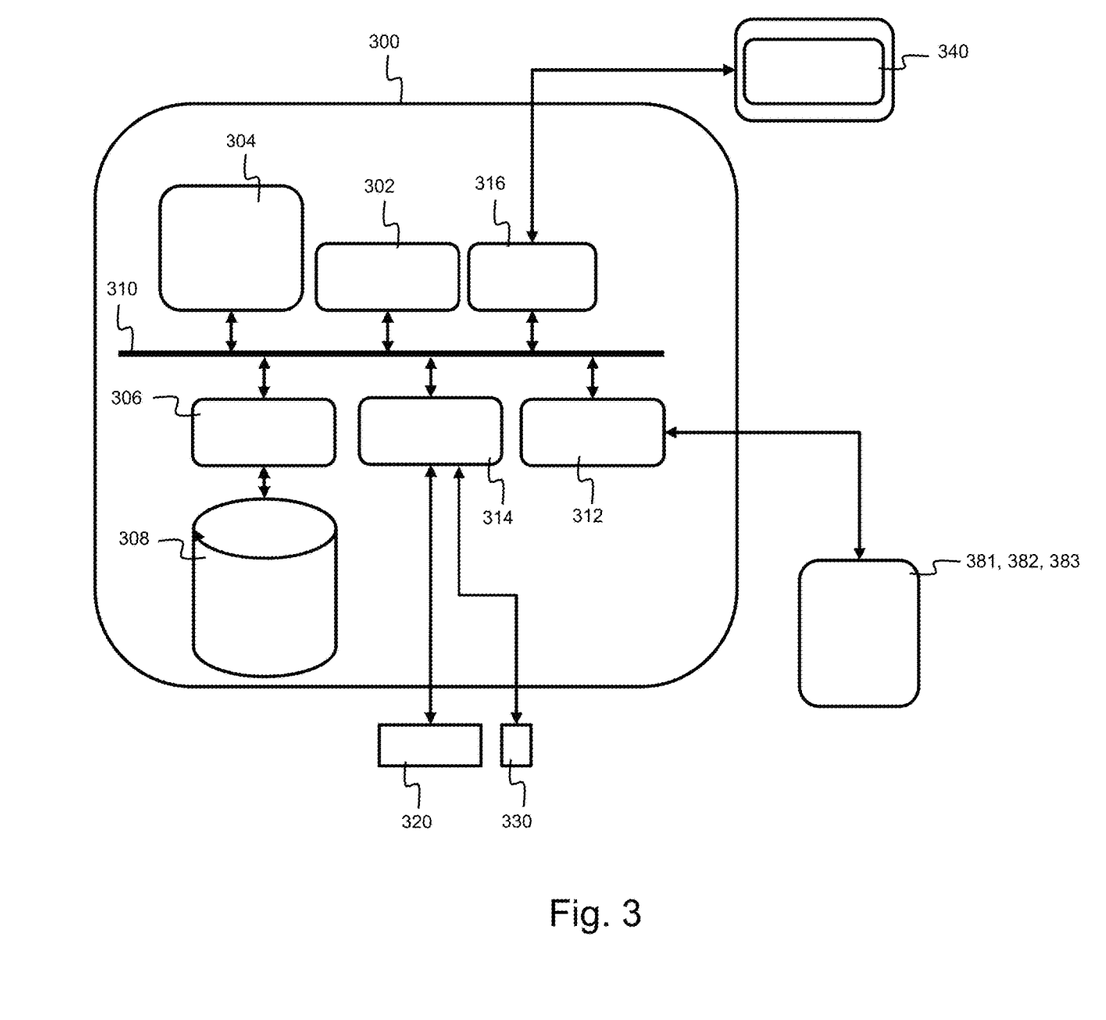
FIG. 3 shows an example embodiment of a suitable computing system 300 for implementing the control unit in embodiments of the container scanning system 100 according to the invention.

FIG. 3 shows a suitable computing system 300 enabling to implement the control unit that forms part of embodiments of the container scanning system according to the invention. Computing system 300 may in general be formed as a suitable general-purpose computer and comprise a bus 310, a processor 302, a local memory 304, one or more optional input interfaces 314, one or more optional output interfaces 316, a communication interface 312, a storage element interface 306, and one or more storage elements 308. Bus 310 may comprise one or more conductors that permit communication among the components of the computing system 300. Processor 302 may include any type of conventional processor or microprocessor that interprets and executes programming instructions. Local memory 304 may include a random-access memory (RAM) or another type of dynamic storage device that stores information and instructions for execution by processor 302 and/or a read only memory (ROM) or another type of static storage device that stores static information and instructions for use by processor 302. Input interface 314 may comprise one or more conventional mechanisms that permit an operator or user to input information to the computing device 300, such as a keyboard 320, a mouse 330, a pen, voice recognition and/or biometric mechanisms, a camera, etc. Output interface 316 may comprise one or more conventional mechanisms that output information to the operator or user, such as a display 340, etc. Communication interface 312 may comprise any transceiver-like mechanism such as for example one or more Ethernet interfaces that enables computing system 300 to communicate with other devices and/or systems, for example with other computing devices 381, 382, 383. The communication interface 312 of computing system 300 may be connected to such another computing system by means of a local area network (LAN) or a wide area network (WAN) such as for example the internet. Storage element interface 306 may comprise a storage interface such as for example a Serial Advanced Technology Attachment (SATA) interface or a Small Computer System Interface (SCSI) for connecting bus 310 to one or more storage elements 308, such as one or more local disks, for example SATA disk drives, and control the reading and writing of data to and/or from these storage elements 308. Although the storage element(s) 308 above is/are described as a local disk, in general any other suitable computer-readable media such as a removable magnetic disk, optical storage media such as a CD or DVD, -ROM disk, solid state drives, flash memory cards, . . . could be used. Computing system 300 could thus correspond to the controller in the embodiment of the container scanning system illustrated by FIG. 1A-1D and FIG. 2A-2E.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A container scanning system comprising:
   a camera/sensor unit movably mounted on a container handling crane, said camera/sensor unit comprising a camera and/or sensor for scanning an exterior surface of a container;
   a control unit operationally coupled to said camera/sensor unit, and configured to control movement of said camera/sensor unit;
   a rail mounted on a support beam of said container handling crane, said camera/sensor unit being movably mounted on said rail,
   wherein said container scanning system further comprises a washing station mounted on said support beam or said rail at a predetermined location;
   and further in that said control unit is configured to control, in a washing mode, movement of said camera/sensor unit to said predetermined location and to control said washing station to wash at least a surface of said camera and/or sensor.

2. The container scanning system according to claim 1, wherein said washing station comprises:
   a main washing unit fixedly attached to said support beam or said rail at said predetermined location; and
   a washing arm extending from said main washing unit in a direction facing said surface of said camera and/or sensor unit.

3. The container scanning system according to claim 2, wherein said washing station comprises:
   a liquid tank to hold a washing liquid, said liquid tank being refillable or replaceable;
   a liquid pump coupled to said liquid tank; and
   a liquid conduit coupled to said liquid pump and extending into said washing arm.

4. The container scanning system according to claim 2, wherein said washing station comprises:
   an air intake;
   an air pump coupled to said air intake to compress air; and
   an air conduit coupled to said air pump and extending into said washing arm.

5. The container scanning system according to claim 2, wherein said washing station comprises:
   wipers mounted on said washing arm to dry said surface of said camera/sensor unit.

6. The container scanning system according to claim 2, wherein said washing arm comprises:
   a liquid conduit; and
   liquid sprinklers directed towards said surface of said camera/sensor unit.

7. The container scanning system according to claim 3, wherein said washing arm comprises:
   an air conduit; and
   air vents directed towards said surface of said camera/sensor unit.

8. The container scanning system according to claim 2, wherein said washing arm is movably mounted on said main washing unit to cover an entire surface of said camera/sensor unit during said washing mode.

9. The container scanning system according to claim 2, wherein said control unit is configured to move said camera/sensor unit vertically upward and downward during said washing mode to cover an entire surface of said camera/sensor unit by said washing arm.

10. The container scanning system according to claim 1, wherein said predetermined location corresponds to a height along said support beam;
    wherein the height is reachable without a lift, boom truck, or aerial platform.

11. The container scanning system according to claim 1, wherein said washing mode is entered at regular, pre-programmed times.

12. The container scanning system according to claim 1, wherein said washing mode is entered upon instruction of a human operator.

13. The container scanning system according to claim 1, wherein said washing mode is scheduled by an artificial intelligence unit.

* * * * *